Dec. 6, 1949      A. H. DAVIS      2,490,117
ADJUSTABLE BORING BAR
Filed March 18, 1948
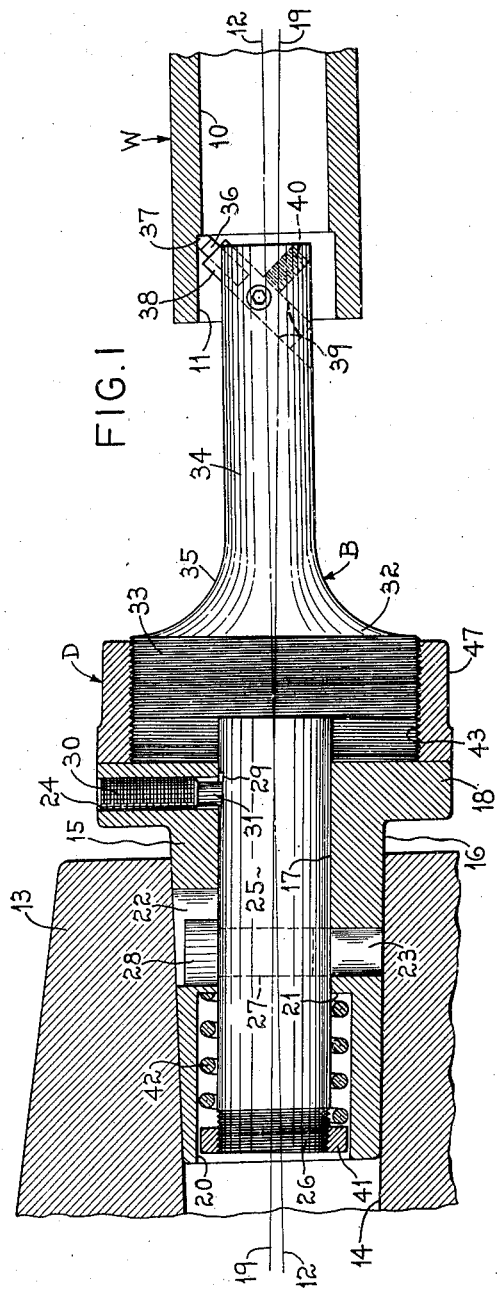
INVENTOR.
ADOLPH H. DAVIS
BY
Toulmin & Toulmin
ATTORNEYS.

Patented Dec. 6, 1949

2,490,117

UNITED STATES PATENT OFFICE 2,490,117

ADJUSTABLE BORING BAR

Adolph H. Davis, Norwood, Ohio, assignor to The R. K. Le Blond Machine Tool Company, Cincinnati, Ohio, a corporation of Delaware Application March 18, 1948, Serial No. 15,521

3 Claims. (Cl. 77—58)

The present invention deals with boring bars commonly employed in machine tools for the purpose of finishing bores and is concerned primarily with the feature of adjustability.

In many instances, the requirements of a particular job call for the finishing of a bore with a high degree of accuracy. This means that the point of the boring tool must be accurately adjusted with respect to the bore axis and at the present time there is not available in the machine tool field any adjusting mechanism which will adjust the point of the tool with the fine micrometer adjustment which is necessary to give the close sizing of work that is required in some cases.

With the foregoing conditions in mind, the present invention has in view as its foremost objective the provision, in a boring bar and associated mechanism of the character above set forth, of means for adjusting the tool radially with a degree of nicety and accuracy which heretofore has not been attained.

A boring bar assembly of the type with which this invention is concerned ordinarily comprises a bar holder that is adapted to be mounted in a chuck or other suitable driving member. The boring bar is carried by the holder and in turn carries the tool with the point of the latter spaced a required distance from the axis of rotation. In attaining the fine micrometer adjustment which is the primal object of this invention, the boring bar is adjustably mounted in the holder for longitudinal movement in a direction that is at a small angle with respect to the axis of the holder. Thus a comparatively large amount of longitudinal movement results in a comparatively small amount of radial movement at the point of the tool.

More in detail, the invention has as an object the provision, in a boring bar assembly of the type indicated, of a holder having a bore the axis of which is at an angle with respect to the axis of rotation of the holder. A boring bar is longitudinally mounted in this bore and means is provided for causing and controlling its longitudinal movement therein.

Still another object of the invention is the provision, in a boring bar assembly of the character indicated, of yieldable means for normally urging the bar in one direction with respect to the holder and screw means for opposing this yieldable means. In a practical embodiment, the yieldable means takes the form of a spring which urges the bar in one direction in the holder while a graduated dial is threadedly mounted on the bar whereby the position of the latter with respect to the holder is determined by the position into which the dial is adjusted.

Inasmuch as proper operation of the dial requires that the bar be held against rotation with respect to the holder, a further object of the invention is the provision, in a boring bar assembly of the type noted, of means for holding the bar against rotation with respect to the holder. This means may take the form of a pin that extends through aligned radial openings in the bar and holder.

After the bar has been adjusted in the holder to provide a required degree of radial adjustment on the part of the tool, it is desirable to clamp or lock the bar in its adjusted position. Thus, a further object of the invention is the provision, in a boring bar assembly of the character indicated, of means for locking the bar in adjusted position in the holder.

When the radial adjustment is provided for by a small increment of a large amount of longitudinal movement as provided for by this invention, a distinct advantage is presented in that the point of the tool always remains in the same relative position with respect to the center axis of the work piece. This is in contrast to any arrangement in which the bar or tool holder itself is rotated to cause the radial adjustment. In a boring operation of this type there is usually a definite relation between the point of the tool and the center axis of the work piece which is most favorable to the boring operation. When adjustability is provided for in accordance with the precepts of this invention, this relation is maintained throughout the range of adjustment.

Various other more detailed objects and advantages of the invention such as arise in carrying out the above noted ideas in a practical embodiment will in part become apparent and in part be hereinafter stated as the description of the invention proceeds.

The invention therefore comprises a boring bar assembly including a holder with a boring bar adjustably mounted therein for longitudinal movement along a line at a small angle with respect to the axis of rotation of the holder to provide a small increment of radial movement at the point of a tool carried by the bar. Mechanism for causing and accurately controlling this adjustability is included as a part of the invention.

For a full and more complete understanding of the invention, reference may be had to the following description and drawing wherein:

Figure 1 is a longitudinal section through the holder of a boring bar assembly designed in accordance with the precepts of this invention and bringing out the bar in elevation with the chuck and work piece shown in section.

Figure 2 is a detailed perspective of the holder per se.

Figure 3 is a detailed perspective of the graduated dial per se.

Referring now to the drawing where like reference characters denote corresponding parts and first more particularly to Figure 1, a work piece is shown at W as having an unfinished bore 10 which is to be enlarged by the boring tool to provide a finished bore 11. The axis of the work piece is represented by the broken line at 12 and for the purpose of this description this axis 12 will be taken as the axis of rotation. It is to be clearly understood that while the present invention is described on the understanding that it is the work piece W which is stationary, as in a lathe, the work piece could be rotated and the boring bar held stationary to perform the boring operation. The illustrative arrangement of having the work piece W stationary on the axis 12 is not to be considered as a limitation of the invention.

It is necessary that the boring bar assembly of this invention be appropriately held in a chuck or other suitable device which would take the form of the driving member when the work piece W is stationary. The invention is not concerned with the particular type of chuck. Thus, the chuck which is represented at 13 is shown purely for illustrative purposes. This chuck 13 is formed with a conical socket 14, the axis of which constitutes a continuation of the axis 12 and is so indicated by continuation of the broken line 12.

The boring bar assembly of this invention comprises three main elements, namely, a holder which is referred to in its entirety by the reference character H and shown in detail in Figure 2, a bar designated generally B, and a graduated dial D.

Referring now more particularly to Figures 1 and 3, the holder H comprises a shank 15 having an outer conical wall 16 that is complemental to and adapted to be snugly fitted into the conical socket 14. The shank 15 is also formed with a cylindrical bore 17 which is continued through an end flange 18. This cylindrical bore 17 has an axis represented by the broken lines at 19 and it is important to note there is a small angle between the axes 12 and 19, this angle being the very heart of the present invention.

The bore 17 at the end remote from the flange 18 is enlarged to provide a counterbore 20 which defines a shoulder 21. The shank 15 is also formed with openings 22 and 23 in diametrically opposed relation. The end flange 18 is formed with radial passages 24 which are provided with threads for a purpose to be later described.

The boring bar B comprises a shank 25 of cylindrical formation which is snugly received in the bore 17 and which has an axis coinciding with the axis 19. The free end of this shank 25 is provided with threads shown at 26 and it is formed with a cross passage represented by the dotted lines at 27. This passage 27 aligns with the openings 22 and 23 and a pin 28 passes through the aligned openings. The shank 25 is also formed with small flats at 29 opposite to the radial passages 24 and, as shown in Figure 1, these flats are slightly inclined with respect to the axis of the shank. Locking screws 30 are screwed into the radial passages 29 and each of them has an end part 31 having an end surface complemental to and in engagement with the respective flat 29.

The boring bar B also includes an intermediate outwardly extending flange 32 that is provided with threads 33. This flange 32 is disposed intermediate the shank 25 on one side and a front extension 34 on the other. The latter takes a cylindrical form over its main body portion with the cylinder surface merging in with the flange 32 at the curved surface 35. It is important to note that the cylindrical surface 34 has as its axis the axis of rotation which is represented at 12 rather than the axis 19, this being considered the more desirable arrangement, particularly when the boring bar assembly is rotated and the work held stationary.

The forward extension 34 of the bar B carries a tool 36 having a point represented at 37. This tool 36 may be mounted on the bar B in any manner which is considered as conventional and standardized practice in the machine tool art. In the form of the invention illustrated, it is carried by an angle bar 38 which is received in an angularly disposed passage represented by the broken lines 39 and locked in position by a set screw represented by the broken lines at 40.

Screwed onto the threads 26 is a ring nut 41 and an expansion coil spring 42 is positioned in the counterbore 20 and engages the shoulder 21 at one end and the nut 41 at the other. As this is an expansion spring, its normal tendency is to pull the bar B into the holder H.

The dial D has an inner threaded bore 43 which is screwed onto the threads 33 and an end face 44 which abuts the end face of the flange 18. The outer cylindrical wall of the dial D is divided into two parts. One of these carries the calibrations shown at 45 in Figure 3 and which calibrations are adapted to cooperate with the fixed mark or pointer shown at 46 on the flange 18 and a part 47 having a knurled surface which facilitates manual operation of the dial D.

It is evident that if the dial is rotated in one direction, it will permit the spring 42 to draw the bar B into the holder H and if rotated in the opposite direction it will pull the bar B out of the holder H against the influence of the spring 42.

Operation

Before describing the manner in which the above mechanism is actuated and used, certain dimensions are given purely by way of illustration and to show how the fine micrometer adjustment is attained. Thus, while the angle between the axes 12 and 19 may be varied so as to give any desired ratio between the radial increment of movement on the part of the tool point 37 and the longitudinal movement of the bar B, it is noted that if this angle between the axes 12 and 19 is one degree and nine minutes, the ratio of longitudinal to radial movement will be about 50 to 1. That is, the point 37 will move radially about one-fiftieth of the distance that the shank 25 moves in the bore 17.

If it is assumed that the threads 33 have sixteen turns to the inch, it would mean that one complete revolution of the dial D would result in a radial movement on the part of the point 37 of about one-thousandth of an inch and if the calibrations 45 were so designed as to provide 36 degrees between each main division mark, that is, breaking up the full 360 degrees into ten sections, a turning of the dial for the distance of one of these sections would result in radial movement on the part of the point 37 of about one-ten thousandth of an inch. This example clearly illustrates how the mechanism translates a very large amount of movement on the part of the dial into a very small radial increment on the part of the point of the tool.

When an operator is desirous of making an adjustment, he first unscrews the lock screws 30 so as to withdraw the end faces at 31 from the flats 39. He now rotates the dial D, the amount of rotation being indicated by the fixed pointer 46 and the calibrations 45. This either permits the spring 42 to draw the bar B into the holder H or the bar B is withdrawn from the holder H against the influence of the spring. The lock screws 30 are then again tightened to fix the adjustment.

While a preferred specific embodiment of the invention is hereinbefore set forth it is to be clearly understood that the invention is not to be limited to the exact construction and dimensions illustrated and described because various modifications of these details may be provided in putting the invention into practice within the purview of the appended claims.

What is claimed is:

1. In an adjustable boring bar, a conical shank, means for mounting said shank in a mating conical socket on a rotary tool spindle with the axis of said shank coinciding with the axis of rotation of said spindle, a bore in said shank having its axis angularly related to said aforementioned axes, a boring bar having a cylindrical portion axially slidable in the bore in said shank, means to hold said boring bar against rotation in said shank, a cylindrical tool bit carrying portion formed integral with said bar, the axis of said tool bit portion being parallel to the axis of rotation of said tool spindle, an abutment end face on said shank lying in a plane at right angles to the axis of the bore in said shank, and means including a dial having an end face engaging said face on said shank and a threaded portion engaging a mating threaded portion on said boring bar so that rotation of said dial causes relative movement of said boring bar and said shank to effect radial sizing adjustments for a tool fixed in the tool bit carrying portion of said boring bar.

2. In an adjustable boring bar, a conical shank, means for mounting said shank in a mating conical socket on a rotary tool spindle with the axis of said shank coinciding with the axis of rotation of said spindle, a bore in said shank having its axis angularly related to said aforementioned axes, a boring bar having a cylindrical portion axially slidable in the bore in said shank, means to hold said boring bar against rotation in said shank, a cylindrical tool bit carrying portion formed integral with said bar, the axis of said tool bit portion being parallel to the axis of rotation of said tool spindle, and means, interacting between said shank and said boring bar to relatively move said boring bar and said shank to effect radial sizing adjustments for a tool fixed in the tool bit carrying portion of said boring bar, comprising a threaded flange portion on said boring bar formed integral with and having its axis coinciding with the axis of the bore in said shank and located adjacent said cylindrical portion of the boring bar carried in said bore in said shank, an adjusting dial threadedly mounted on said threaded flange portion having an end abutment face engaging a mating end face on said shank which lies in a plane at right angles to the axes of the bore in said shank and the cylindrical portion of the boring bar carried in the bore in said shank, inter-related graduations on said adjusting collar and said shank, and resilient means interacting between said shank and said tool bar to maintain engagement between the faces of said dial and said shank.

3. In an adjustable boring bar as set forth in claim 2, the inclusion of means for positively locking said tool bar to said shank at the conclusion of the adjusting operation.

ADOLPH H. DAVIS.

REFERENCES CITED

The following references are of record in the file of this patent:

UNITED STATES PATENTS

| Number | Name | Date |
| --- | --- | --- |
| 521,922 | Stevenson | June 26, 1894 |
| 659,844 | Hulse | Oct. 16, 1900 |
| 1,893,810 | Travis | Jan. 10, 1933 |